United States Patent [19]

Bayer et al.

[11] Patent Number: 4,598,017

[45] Date of Patent: Jul. 1, 1986

[54] COMPOSITE MAGNETIC DISK WITH SI AND SIC SUBSTRATE

[75] Inventors: Thomas Bayer; Holger Hinkel, both of Boeblingen; Kurt Kleischmann, Wildberg; Ulrich Kuenzel, Kusterdingen; Rolf Schäfer, Gaertringen-Rohrau, all of Fed. Rep. of Germany

[73] Assignee: International Business Machines Corporation, Armonk, N.Y.

[21] Appl. No.: 612,768

[22] Filed: May 22, 1984

[30] Foreign Application Priority Data

May 27, 1983 [EP]  European Pat. Off. ........ 83105262.6

[51] Int. Cl.$^4$ .............................................. G11B 5/64
[52] U.S. Cl. ..................................... 428/336; 360/135; 427/128; 427/131; 427/130; 428/367; 428/408; 428/413; 428/416; 428/418; 428/419; 428/694; 428/698; 428/446; 428/900
[58] Field of Search ............... 428/694, 328, 329, 900, 428/446, 367, 698, 419, 416, 418, 413, 408, 336; 360/135, 131; 427/130, 128, 131

[56] References Cited

U.S. PATENT DOCUMENTS

| 3,959,553 | 5/1976 | Hartmann | 427/131 |
| 4,069,360 | 1/1978 | Yanaisawa | 427/130 |
| 4,376,963 | 3/1983 | Knoop | 427/131 |
| 4,489,129 | 12/1984 | Shue | 428/367 |
| 4,499,122 | 2/1985 | Economy | 427/130 |
| 4,536,449 | 8/1985 | Kennedy | 428/698 |

FOREIGN PATENT DOCUMENTS 0043220  3/1985  Japan ................................ 428/694

*Primary Examiner*—Ellis P. Robinson
*Attorney, Agent, or Firm*—Henry E. Otto, Jr.

[57] ABSTRACT

The invention relates to a composite magnetic disk for magnetic recording, which consists of an annular core of polymeric material to which is bonded at least one disk of reaction-bonded silicon carbide with a magnetic recording layer on its outer surface. After its processing, the SiSiC disk surface shows optimum planarity and smoothness so that it can be used as a magnetic disk substrate. Furthermore, the material has a low density and an extremely high specific modulus of elasticity so that numbers of revolution higher than obtainable with formerly known AlMg5 disk substrates can be reached.

7 Claims, 3 Drawing Figures

COMPOSITE MAGNETIC DISK WITH SI AND SIC SUBSTRATE

BACKGROUND OF THE INVENTION

1. Field of the Invention

This invention relates to magnetic recording disks, and relates more particularly to such disks formed as a composite structure.

2. Description of the Prior Art

In magnetic recording, rigid record carriers are used which usually consist of an aluminum substrate and a magnetic layer provided thereon consisting of a dispersion of a magnetic pigment in a curable binder. The magnetic layer of record carriers of that type is usually between 0.5 and 1.5 μm thick and can be used for record densities of up to 10,000 bpi. For higher record densities magnetic layers are required which differ, regarding the layer thickness as well as the magnetic values, from the conventional oxide dispersion layers. U.S. Pat. No. 3,704,211 shows that the record density depends on the layer thickness and the coercive force. For that reason it has been attempted to reduce the layer thickness by increasing the packing density and the coercive force. This is achieved e.g. by applying extremely thin ferromagnetic films which are usually made by sputtering, evaporation, or electroplating of metals of the eighth subgroup of the periodic system in a high vacuum on an aluminum substrate, or by applying ferromagnetic films of corresponding metal salt solutions in accordance with galvanic or chemical processes. Magnetic thin film disks made by applying a magnetic coating on an aluminum substrate in accordance with one of the above mentioned methods usually have magnetic layers which are thinner than those which can be made with magnetic particles dispersed in a curable binder. The disadvantage of these thin film disks is that frequently there are corrosion problems, mainly because of the reaction between the metal substrate, which for weight reasons is aluminum, and the thin film deposited thereon. In these disks, one or several protective layers have had to be provided between the substrate and the magnetic thin film layer, and over the thin film layer. It is obvious that the application of protective layers represents a considerable cost factor in the production of thin film disks. Furthermore, for magnetic disks with conventional oxide dispersion layers, as well as for those with magnetic thin films, a substrate with a much greater thickness than that of the magnetic layer was used, which considerably adds to the weight of a device containing several such disks.

A considerable problem in connection with the production of magnetic disks on the basis of thin metallic ferromagnetic films is the providing of suitable substrates. As the layer thicknesses of metallic ferromagnetic films are much below that of commercially available magnetic storage devices coated with a dispersion of δ-iron-III-oxide in a binder, very high demands are made on the substrate surface with respect to surface roughness, and the absence of scratches and holes. It is therefore desirable to achieve maximum surface perfection quality of the magnetic disk substrates.

In the past, magnetic disks generally used as a substrate aluminum disks whose surface had been made particularly smooth through mechanical processing steps as grinding, forming and lapping. Depending on the type of process, however, there frequently appear lapping scratches which are very difficult to remove in a subsequent grinding process. In connection with very thin films, however, minimum recesses in the substrate surface cause defects in the overlying magnetic coating, and on the other hand an over-intensive grinding or polishing will subsequently impact the planarity of the substrate. This, in turn, causes an undesired amplitude modulation, and a contacting between the magnetic head and disk if the information recorded is read with flying magnetic heads. Another problem connected with the production of perfect substrates suitable for metal films is the quality of the aluminum alloy used. Oxide inclusions and cavities in the surface of the aluminum disk can cause holes and recesses in processing, and additional defects when the magnetic disk is used. The methods for polishing substrate surfaces and the coating methods could be improved, but further improvements in the quality of the magnetic disks can be achieved only with nearly perfect substrate surfaces.

Prior art describes a number of composite magnetic disks. Examples are U.S. Pat. No. 3,681,225, U.S. Pat. No. 4,069,360 and U.S. Pat. No. 4,376,963.

U.S. Pat. No. 3,681,225 describes a magnetic disk where a magnetic layer is made by electro-deposition on a synthetic resinous core. U.S. Pat. No. 4,069,360 describes a magnetic recording element where on a disk made of an alloy a layer of a non-magnetic alloy is provided which covers the surface of the alloy disk. On this layer there is a thin film consisting of a magnetic metallic medium and covering a polished or finely processed surface of the alloy layer, an amorphous inorganic oxide layer covering the thin film surface, and a lubrication layer covering the oxide layer and being of such a nature that it adheres thereto. U.S. Pat. No. 4,376,963 describes a composite structure for magnetic recording, where on a core of polymeric material at least one silicon disk is provided which on its outer surface is coated with the magnetic recording material. The surface of the silicon disk is excellent with respect to flatness and smoothness, but the disadvantage of this disk is that its diameter is restricted to the diameters of approximately 15 cm maximum usual for silicon wafers.

SUMMARY OF THE INVENTION

It is the object of the present invention to provide a composite magnetic disk with a rigid carrier which is of high surface quality, and which owing to the advantageous mechanical characteristics of the basic material, e.g. the high specific modulus of elasticity, permits the use of the magnetic disk in connection with extremely high rotational speeds.

The carrier of the magnetic disk of the present invention, which consists of a polymeric material core and one or two disks of reaction-bonded silicon carbide, has a planarity and surface smoothness which correspond to that of the above described carrier with silicon disks. Owing to the extremely high specific modulus of elasticity and the low density of the reaction-bonded silicon carbide used, critical numbers of revolution of the thus composed magnetic disks can be reached which are higher by a factor of approximately 2 than the formerly used magnetic disks with AlMg5 disk substrates.

BRIEF DESCRIPTION OF THE DRAWINGS

The invention will be described in detail with reference to the specification and one embodiment, and the drawings. The drawings show the following.

DESCRIPTION OF THE PREFERRED EMBODIMENT

Efforts are made to reduce the access time for magnetic disk storage systems. Such a reduction of the access time can be realized either by increasing the bit density, or/and by increasing the number of disk revolutions. The bit density could be increased with thinner storage layers, defects and corrosion still presenting insurmountable problems. Reducing the access time by increasing the number of disk revolutions is only possible to a certain degree because the number of revolutions is limited in upward direction by predetermined resonance oscillations appearing at a critical number of revolutions $\Omega_C$. For the critical number of revolutions there applies $$\Omega_C \sim \sqrt{\frac{E}{\rho}},$$

E being the modulus of elasticity, and the density of the material.

According to the present invention, a composite magnetic disk is made with a carrier whose surface has excellent processing quality, so that a carrier with a high surface smoothness and planarity is obtained onto which thinner storage layers can be applied. The carrier is made of a material that is characterized by a low density and an extremely high modulus of elasticity, so that critical numbers of revolution can be reached.

Figure 1:
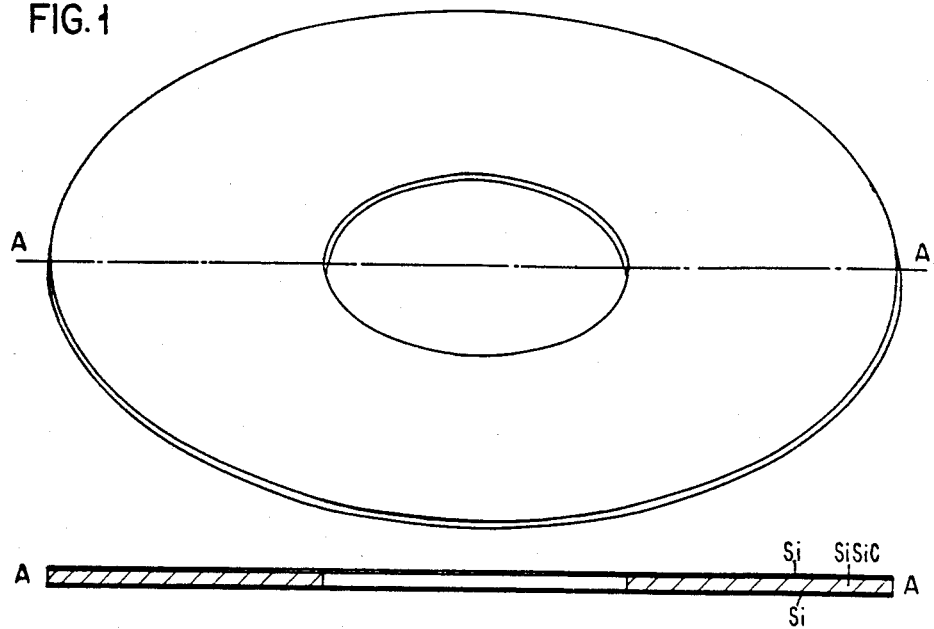
FIG. 1 a perspective view of a disk of reaction-bonded silicon carbide which has on both sides a silicon surface.

In an embodiment, disks are made in accordance with FIG. 1, of reaction-bonded silicon carbide with an outer diameter, for example, of 35.6 cm, an inner diameter of 17.8 cm and a thickness of 0.5 mm. Usually, production is implemented in that a so-called green mixture is formed of silicon carbide grain mixtures, soot or graphite, if necessary silicon, a binder, and a hardening agent for the binder, and if necessary an organic lubricant. In practical realization, it is e.g. possible to use a starting mixture of 74% by weight α-silicon carbide with a maximum grain size of up to 150 μm, 13% by weight soot with a maximum grain size of up to 50 μm, 11% by weight furfuryl alcohol as a binder, and 2% by weight p-toluenesulfonic acid as a hardening agent. It is also possible to admix a solvent and an organic lubricant. The thus composed mixture can be pre-dried in a vacuum furnace, or in a protective gas atmosphere of less than 100° C. Subsequently, disks are made on a molding press with the desired dimensions and a central opening. The pressure can e.g. amount to 60 N/mm².

The silicon carbide disks are pre-cured at a temperature of approximately 1000° C. The disks may then be ground to reach a roughness Ra of approximately 200 nm. Subsequent to the grinding of the disks, they may be subjected to a siliciding process. For that purpose, silicon has to be applied externally, either in a direct contact with fluid silicon, or via an Si or SiO vapor phase. The former method, i.e. fluid phase infiltration, can be executed as an immersion, packing or wick impregnation. The processes are executed in such a manner that first the pores of the SiC disks are filled with silicon and subsequently an approximately 1 to 10 μm thick silicon layer is formed on the disk surface. According to the immersion process, the disks are first immersed in molten silicon kept at a temperature between 1500° and 1700° C. There, the pores of the SiC disks are filled with silicon. During a second immersion step in a boron-enriched silicon melt which melts at less than 1400° C. a thin silicon film is formed on the disk surface. The operating temperature of less than 1400° C. prevents a remelting of the silicon in the pores of the SiC disks.

In the wick impregnation process, the silicon is placed into a crucible and the SiC disks to be silicided are arranged above it. Owing to the capillary effect, the molten silicon rises, at temperatures higher than 1400° C., in the body via the pore system, and infiltrates the body. There is no direct contact with the surface of the body. The disk back is contacted in this process with a highly heat-conductive ceramic (e.g. BeO, Al₂O₃). Via the temperature gradient ΔT, the filling of the pores of the SiC disks with silicon, and the applying of a thin silicon film of up to 10 μm thickness on the surface of the disks is set.

After cooling, the disks are polished on one side until a surface roughness Ra of 25 nm has been reached. Since the surface to be polished is a pure silicon surface the methods successfully applied for the making of silicon wafers can be used. If the desired final roughness Ra of approximately 25 nm cannot be reached in the first step, the disks can once more be immersed in molten silicon at a working temperature of less than 1400° C., and polished again after cooling. The product of the former sequence of process steps is shown in FIG. 1, the representation revealing in a section the approximately 0.5 mm thick SiSiC core which on both sides is covered with an approximately 1 to 10 μm thick silicon layer.

Figure 2:
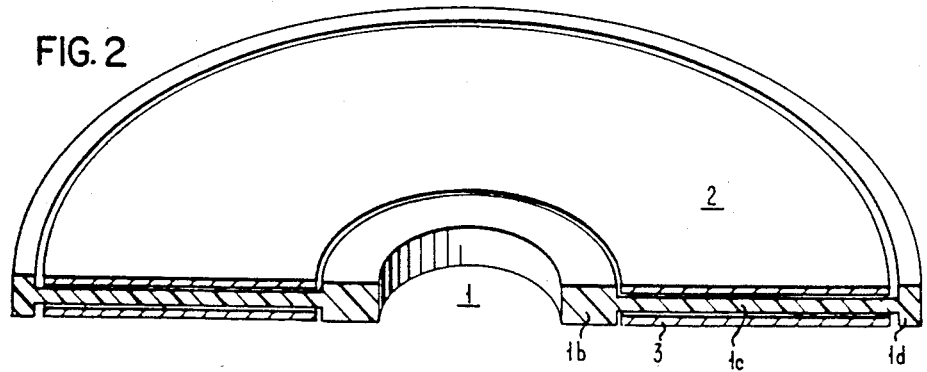
FIG. 2 a perspective view, partly in section, of a composite magnetic disk of a polymeric core which was made in accordance with the injection moulding process and which carries on both sides disks of reaction-bonded silicon carbide.

FIG. 2 shows a magnetic disk structure 1 consisting of SiSiC disks 2 and 3 with a silicon surface and an annular core of polymeric material, the polymeric material being of high rigidity and tensile strength and low elongation. The SiSiC disks are bonded to the core, and a magnetic recording layer is provided on the outer surface of SiSiC disks 2 and 3. The core may be made by injection molding and consists of a polymeric material reinforced with carbon fibers. The reaction-bonded, silicon-infiltrated SiSiC material preferably has a density of approximately 3.2 g/cm³ and a modulus of elasticity of approximately 350 kN/mm². This material has to have the above specified characteristics to be able to resist the forces connected with the high speeds of rotation of up to 6000 revolutions/minute. It has been found that polymeric materials like polyepoxide resins or polyphenylene sulfide are particularly suitable for this purpose.

The core with a central opening comprises a central part 1b of uniform thickness. Section 1c of the core that is adjacent to this part is of a lower thickness and opens into the thicker lip 1d around its periphery. Disks 2 and 3 are bonded on the core in a known manner with a fast cure epoxide resin bond by heating to approximately 80° C. for 45 minutes and approximately 150° C. for 5 minutes. Disks 2 and 3 have, as mentioned above, a surface of high smoothness and planarity. A magnetic layer applied either as a dispersion of δ-iron-III-oxide in a binder, or as a thin metal layer by electroless deposition, is provided on the outer surface of disks 2 and 3 and represents the actual surface for the magnetic recording. The magnetic layer can be applied either before or after the disks 2 and 3 have been bonded to the core. The purpose of the core is to prevent peaks of mechanical tension in the SiSiC disks, and the lip segment 1d is used as an edge protection for the disks. Segment 1b represents a solid surface for clamping the individual structures to each other. If this is necessary, no forces will be exerted on the SiSiC disks themselves. If a number of disk structures is to be assembled into a stack it is possible, in order to simplify the clamping and to avoid a slippage of the disks, to make during the casting of the core structure already mating tabs and slots, or keys and keyways. By varying the quantity and type of fiber reinforcement and binder materials used for making the core, it is possible to achieve the desired balance of the thermal expansion coefficients of the core material, and the recording media and the rigidity of the composite structure.

The structure according to FIG. 2 can be used as a record carrier with two surfaces for recording, in that the device is connected at central segment 1b with a suitable driving motor for rotating disks 2 and 3, and in that magnetic heads radially movable relative to the disks co-act in a known manner with various concentric recording tracks on the disk.

Figure 3:
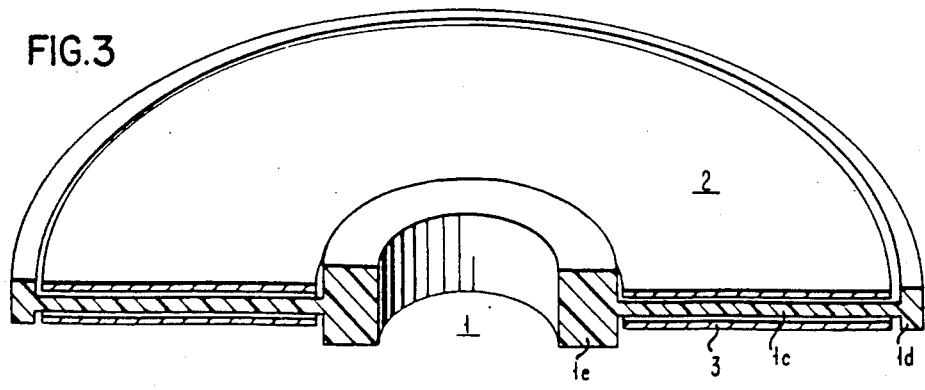
FIG. 3 a modified embodiment of FIG. 2, where the core has a raised center part which facilitates the stacking of several disks.

FIG. 3 depicts a modified embodiment of FIG. 2, with the central part 1e protruding considerably over the surfaces of disks 2 and 3. This embodiment is used if a number of structures are arranged one over the other, forming a magnetic disk pack. The dimensions of the central part 1e permit the providing of sufficient clearance between oppositely placed surfaces of the stacked disks in order to ensure the insertion and movement of the magnetic heads relative to the adjacent recording surface of the disk. As pointed out above, keyways and keys or mating tabs and slots can be provided in central segment 1e so that the forces for clamping the structures and the slippage of a structure in the stack relative to another one can be reduced or eliminated.

We claim:

1. A composite magnetic disk, comprising,
   an annular core of carbon fiber-reinforced polymeric material,
   a disk of reaction-bonded silicon carbide bonded to said core,
   a magnetic recording layer on the outer surface of said silicon carbide disk, and
   a thin layer of silicon interposed between said silicon carbide disk and magnetic layer.

2. A magnetic disk as claimed in claim 1, characterized in that disks of reaction-bonded silicon carbide are bonded on both sides of said core, and that on the respective outer surface of each of the disks a magnetic recording layer is provided.

3. A magnetic disk as claimed in claim 2, characterized in that said disks are made of reaction-bonded silicon carbide with infiltrated silicon.

4. A magnetic disk as claimed in claim 3, characterized in that said reaction-bonded, silicon-infiltrated SiSiC material has a density of approximately 3.2 g/cm$^3$ and a modulus of elasticity of approximately 350 kN/mm$^2$.

5. A magnetic disk as claimed in claim 1, characterized in that said thin layer of silicon is approximately 1 to 10 μm thick and is provided by immersing said disk in a boron-enriched silicon melt which melts at less than 1400° C.

6. A magnetic disk as claimed in claim 1, characterized in that said core is made of a polyphenylene sulfide or epoxide resin reinforced with carbon fibers.

7. A magnetic disk as claimed in claim 2, characterized in that said core has annular recesses into which said disks are inset, the walls defining the inner and outer rims of said recesses serving to protect said outer surfaces of said disks.

* * * * *